United States Patent
Champion et al.

[11] Patent Number: 5,836,165
[45] Date of Patent: Nov. 17, 1998

[54] ADAPTIVE FEEDFORWARD VIBRATION CONTROL SYSTEM AND METHOD

[75] Inventors: Shaun L. Champion, Hermosa Beach; Yeong-Wei A. Wu, Rancho Palos Verde; Michael H. Kieffer, Redondo Beach, all of Calif.

[73] Assignee: Hughes Electronics, Los Angeles, Calif.

[21] Appl. No.: 739,634

[22] Filed: Oct. 30, 1996

[51] Int. Cl.$^6$ .............................. F01B 29/08; F25B 9/00
[52] U.S. Cl. .................................................. 62/6; 60/524
[58] Field of Search ..................... 62/6; 60/520; 364/165

[56] References Cited

U.S. PATENT DOCUMENTS

| | | | |
|---|---|---|---|
| 5,343,707 | 9/1994 | Sata ................................................ | 62/6 |
| 5,392,607 | 2/1995 | Wu ........................................ | 364/165 X |
| 5,412,951 | 5/1995 | Wu .................................................. | 62/6 |

*Primary Examiner*—William E. Wayner
*Attorney, Agent, or Firm*—Leonard A. Alkov; William C. Schubert; Glenn H. Lenzen, Jr.

[57] ABSTRACT

An adaptive feedforward vibration control system reduces vibrations at fundamental and harmonic frequencies of matched reciprocating pistons, such as back-to-back compressor pistons in Stirling cycle cryocooler, by driving the pistons with correction signals. The system is also applicable to reducing the vibrations generated by a pair of opposite expander and balancer pistons in a cryocooler. The correction signals are computed iteratively to increase their accuracy, and need only be updated relatively infrequently to adjust the pistons' motions, thereby enabling the use of a relatively slow microprocessor.

34 Claims, 2 Drawing Sheets

ADAPTIVE FEEDFORWARD VIBRATION CONTROL SYSTEM AND METHOD

This invention was made with government support under Control No. FO470192-C-0062 awarded by the Department of the Air Force. The Government has certain rights in this invention.

BACKGROUND OF THE INVENTION

1. Field of the Invention

This invention relates to adaptive feedforward control for suppressing vibrations produced by oppositely run matched reciprocating pistons, more specifically back-to-back compressor pistons and/or expander-balancer pistons of a Stirling cycle cryocooler, at fundamental and harmonic frequencies.

2. Description of the Related Art

Stirling cycle cryocoolers are used to reduce the temperature of electronic systems, especially infrared detection systems in which the temperature must be kept low to reduce the thermal noise that interferes with detection. In some applications the cryocoolers are used on board satellites to cool various electronic sensors. One example of a Stirling cycle cryocooler with two back-to-back compressor pistons, an expander piston and a balancer piston, is described in A. Wu, "Stirling-Cycle Cryocooler Active Vibration Control," *EOS Technical Journal*, pages 1–6, Summer 1993.

Because a cryocooler operates by mechanical motion of its pistons, undesirable vibrations are generated during its operation which adversely affect the stability of the platform upon which it is placed. Sensitive electronic systems mounted on the same platform vibrate with the cryocooler, causing problems in their operations as well as mechanical stress. For example, if an optical or infrared instrument is mounted on a vibrating platform, the images sensed by the instrument would be blurred. In satellite operations in which the stability of the platform is extremely important to steadily hold an electronic sensor to a desired direction, it is highly desirable that the vibrations at fundamental and harmonic frequencies be effectively reduced.

Individual control of the motion of each piston has been achieved by a servo-controlled motor, which adjusts the piston's driving force to actively cancel the vibrational force in response to computed compensation signals, as described in the above A. Wu article. The article discloses active cancellation of vibrations by a narrowband feedback control method, the implementation of which requires all of the throughput of a processor continuously operating at a minimum of 6 million instructions per second (MIPS), and is therefore undesirable for spacecraft applications.

An adaptive feedforward control system for reducing cryocooler vibrations only at harmonic frequencies is described in U.S. Pat. No. 5,392,607, which also requires the throughput of a processor continuously operating at a minimum of 6 MIPS. The system does not suppress vibrations at the fundamental frequency.

SUMMARY OF THE INVENTION

The present invention provides an adaptive feedforward control system and method for reducing vibrations at fundamental and harmonic frequencies generated by a pair of oppositely run reciprocating motor driven pistons, such as back-to-back compressor pistons in a cryocooler. The invention is also applicable to the vibration control of a pair of oppositely directed expander and balancer pistons in a Stirling cycle cryocooler.

The control system senses the vibrational forces generated by the compressor pistons, and then generates correction signals which are injected into the piston drive motors to reduce the vibrations. The sensed vibration signals are digitized by an analog-to-digital (A/D) converter and separated into different fundamental and harmonic frequency components. Separate correction signals are computed for these frequencies, and are added together to generate a combined correction signal. An iterative loop reduces errors in the correction signals. The correction signal is output to the motor drive after the first iteration of the algorithm, and is updated in each iteration until the vibration level is reduced to the level of the A/D converter's sampling noise and resolution. The invention can be implemented with a computer having a relatively low processing throughput.

These and other features and advantages of the invention will be apparent to those skilled in the art from the following detailed description, taken together with the accompanying drawings, in which:

DETAILED DESCRIPTION OF THE INVENTION

This invention provides an adaptive feedforward control system and method to actively reduce the vibrations generated by oppositely run reciprocating motor driven pistons, such as a pair of back-to-back compressor pistons in a cryocooler. The system measures the vibrational forces in real time and generates correction signals to adjust the piston drive forces to actively cancel the vibrations. The system is applicable to a cryocooler compressor module having a pair of opposite compressor pistons, as well as to a cryocooler expander module having opposite expander and balancer pistons.

Figure 1:
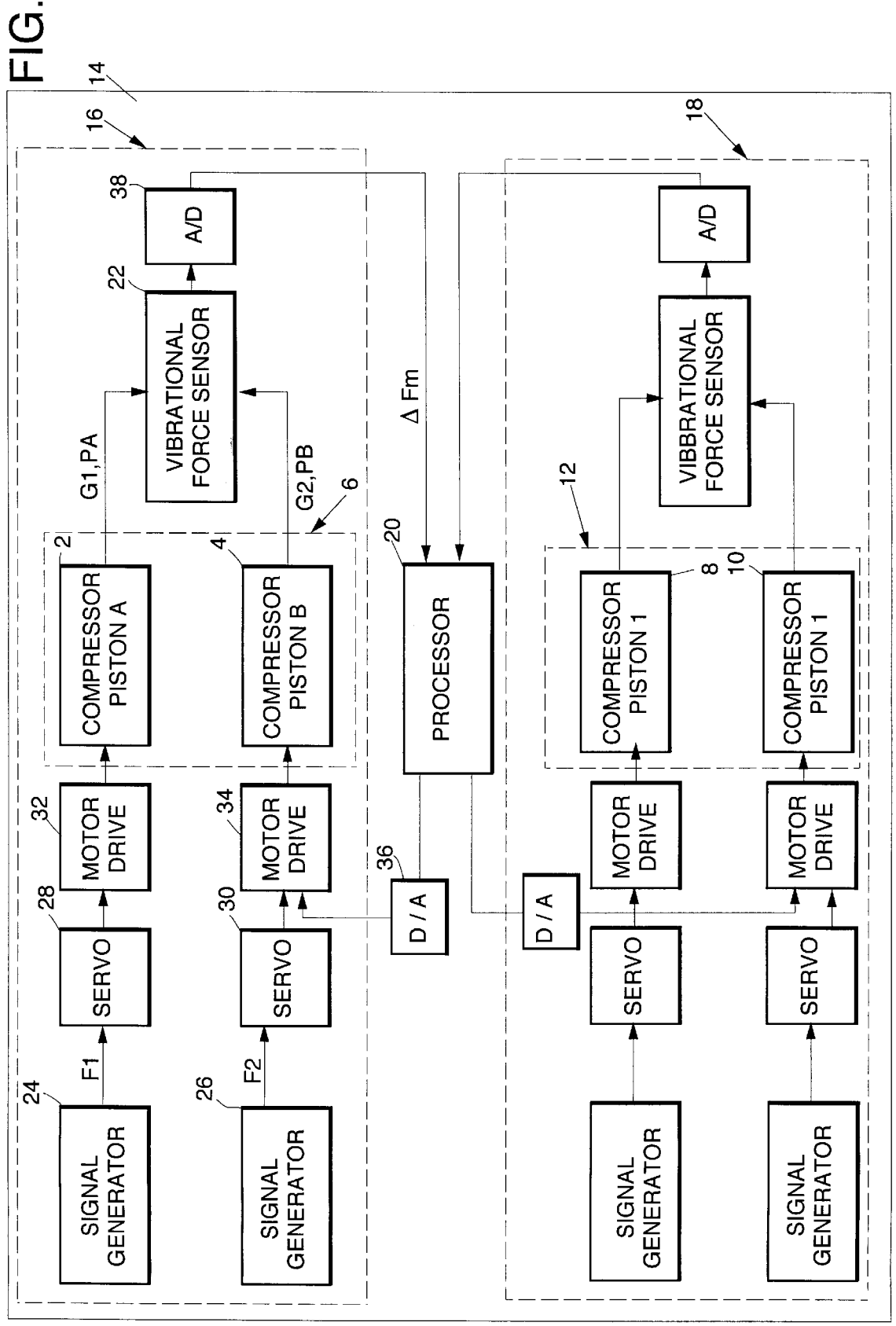
FIG. 1 is a block diagram of an adaptive feedforward vibration control system in accordance with the invention for a spacecraft cryocooler.

A block diagram of the system is shown in FIG. 1, which is applicable to a cryocooler that has a pair of back-to-back compressor pistons 2 and 4 in a compressor module 6 and a pair of expander and balancer pistons 8 and 10 in an expander module 12. The cryocooler and the adaptive feedforward vibration control system can be mounted on board a spacecraft which is indicated generally by block 14. A control system 16 for the compressor module 6 can be identical in structure to a control system 18 for the expander module 12, and therefore the vibration control of the compressor module described below is also applicable to the expander module. The control systems 16, 18 for the compressor and expander modules 6, 12 can share the same processor 20.

For the compressor module 6, a vibrational force sensor 22, preferably a "load cell," is attached to a fixed location on a support mounting of the cryocooler. Other types of vibrational force sensors, such as load washers and accelerometers, can also be used. The location of the force sensor is called a force measurement point. Each piston is equipped with a position sensor that measures the piston's position in real time. The piston's drive force F can be derived from the equation $$F = M\frac{d^2X}{dt^2} \quad (1)$$

where M is the piston mass, X is the piston position and t is time. A force injection point is where the processor injects the correction signal into the motor drive. The gain and phase measurements are made relative to this point since they are used in forming the correction signal. The force transfer function from the force injection point to the force measurement point can be characterized by a gain G and a phase P. Gain $G_A$ and phase $P_A$ are the respective gain and phase of the transfer function of the force due to the compressor piston A 2, while gain $G_B$ and phase $P_B$ are the respective gain and phase of the transfer function of the force due to the piston B 4. In general, $G_A$ and $P_A$ of the first compressor piston A are different from $G_B$ and $P_B$ of the second piston B, respectively. Gain and phase need only be measured for the piston's motor drive into which the correction signal is injected.

Furthermore, it is assumed at this stage that $G_A$, $G_B$, $P_A$ and $P_B$ are known precisely. In reality, the gain and phase can be obtained with reasonable accuracy from the measured amplitudes and phases of the forces at the force injection and measurement points. The measured gains and phases for the fundamental frequency and harmonic frequencies of interest are assumed to be fixed and can be stored in a computer memory for the computations of correction signals. Even if the gains and phases are not accurately known, the iterative correction signal computations described below provide a great degree of vibration reduction, provided that the measured phase is within ±44° of the actual value, and the measured gain is between 50% and 200% of the actual value to maintain stability for convergence.

The first and second signal generators 24 and 26 send piston drive commands F1 and F2 to analog servos 28 and 30 that control the piston motor drives 32 and 34 of the compressor pistons A and B, respectively. The piston motor drive for the compressor piston B also receives commands from the processor 20 that provides correction signals, which are converted from a digital to an analog waveform by a digital-to-analog (D/A) converter 36, to actively cancel fundamental and harmonic frequency vibrations. For the expander module, the correction signals are sent to the piston motor drive for the balancer piston 10. The initial piston drive command $F1_0$ for the compressor piston B is represented as $$F1_0 = A_0 \sin(\omega_0 t) \quad (2)$$

The initial piston drive command $F2_0$ for the second piston, which is directed to exert a force equal and opposite to the first piston in a back-to-back compressor configuration, is $$F2_0 = -F1_0 = -A_0 \sin(\omega_0 t) \quad (3)$$

At this point, the piston drive commands are assumed to be generated perfectly, with angular frequency $\omega_0$ and stroke amplitude $A_0$. When the initial piston drive commands F1 and F2 are applied to the compressor pistons, the residual vibrational force $\Delta F$ at the force measurement point resulting from the forces of the two pistons is $$\Delta F = \Delta F_0 = G1(A_0 \sin(\omega_0 t + P1)) + G2(-A_0 \sin(\omega_0 t + P2)) + harmonics \quad (4)$$

where $\Delta F_0$ is the initial residual vibrational force.

The harmonics, which are vibrations at frequencies that are integral multiples of the fundamental frequency, are generated by the nonlinearities in the cryocooler's mechanical structure when subjected to a vibrational force at the fundamental frequency. The sum of residual forces due to the harmonics are represented as $$harmonics = \sum_{n=1}^{\infty} a_n \sin(n\omega_0 t) \quad (5)$$

where n is an integer and $a_n$ is the force amplitude for the $n^{th}$ harmonic.

The actual initial residual force $\Delta F_0$, which is the sum of the forces generated by the pistons A and B at the force measurement point, is measured in real time by the vibrational force sensor 22, preferably a load cell that generates an electric signal in response to a mechanical force. The measured $\Delta F_0$, which is defined as $\Delta F_m$, is converted to a digital format by an analog-to-digital (A/D) converter 38, which feeds the digitized data to the processor 20. The initial residual vibrational force $\Delta F_0$ can be assumed to be equal to the measured $\Delta F_m$, which is $$\Delta F_m = K_m \sin(\omega_0 t + \theta) + harmonics \quad (6)$$

where $K_m$ and $\theta$ are unknown at this time. Because we assign an equality between the measured $\Delta F_m$ and the actual $\Delta F_0$, the following equation holds:

$$K_m \sin(\omega_0 t + \theta) + harmonics = G1(A_0 \sin(\omega_0 t + P1)) + G2(-A_0 \sin(\omega_0 t + P2)) + harmonics \quad (7)$$

which results in $$K_m \sin(\omega_0 t + \theta) = G1(A_0 \sin(\omega_0 t + P1)) + G2(-A_0 \sin(\omega_0 t + P2)) \quad (8)$$

The terms representing the harmonics disappear in the above equation.

The digitized data for $\Delta F_m$ is sent to the processor 20, which converts the data from the time domain to the frequency domain for the residual fundamental and harmonic frequencies of interest, preferably by computing the Fourier coefficients at these frequencies. After the Fourier coefficients are computed, the fundamental and harmonic frequency components of the residual force can be separately processed to generate correction signals to cancel the residual force.

The Fourier coefficients $B_k$ and $C_k$ of the sine and cosine components for the residual force are, respectively:

$$B_k = \frac{1}{2T_0} \int_{2T_0} (\Delta F_m \sin(k\omega_0 t)) dt \quad (9)$$

$$C_k = \frac{1}{2T_0} \int_{2T_0} (\Delta F_m \cos(k\omega_0 t)) dt \quad (10)$$

where k=1 for the fundamental frequency and $T_0 = 2\pi/(k\omega_0)$, which represents one period of fundamental frequency. The fundamental frequency is treated exactly the same as the higher frequencies in the processing and generation of correction signals. In a digital processor, the coefficients $B_k$ and $C_k$ are computed by a method such as a discrete Fourier transform or a fast Fourier transform that includes the fundamental and harmonic frequencies of interest, instead of computing continuous integrals. To obtain the Fourier coefficients for a harmonic frequency, k is an integer which corresponds to the harmonic number.

The residual force at the fundamental frequency can be cancelled by generating cancellation signals to control the forces of the two pistons. Once the Fourier coefficients are calculated, the fundamental frequency component of the measured residual force $\Delta F_m$ can be re-constructed and represented as $\Delta F_{fundcomp}$, which is given by the following relationship:

$$\Delta F_{fundcomp}(t) = a_0 + 2(B_k \sin(k\omega_0 t) + C_k \cos(k\omega_0 t)) \quad (11)$$

where k=1 and $a_0=0$. $\Delta F_{fundcomp}$ is equivalent to the fundamental frequency component of the measured residual force $\Delta F_m$, that is, $$\Delta F_{fundcomp}(t) = K_m \sin(\omega_0 t + \theta) \quad (12)$$

With this relationship, it follows that $$K_m = 2\sqrt{B_1^2 + C_1^2} \quad (13)$$

and $$\theta = -\tan^{-1}(C_1/B_1) \quad (14)$$

With knowledge of the computed fundamental frequency component of the residual force $\Delta F_{fundcomp}$, a correction signal $F_{fundcorr}$ can be computed and then added to the initial force command $F1_0$ for the piston B to cancel the fundamental frequency component of the residual vibration. Based upon the knowledge of the gain G1 and the phase P1 from the piston's force injection point to the force measurement point, where G1 and P1 denote the fundamental frequency components of the system gain $G_B$ and phase $P_B$, respectively, the correction signal $F_{fundcorr}$ is computed by a combination of gain inversion and time shifting as follows:

$$F_{fundcorr}(t) = \left(-\frac{1}{G1}\right) \Delta F_{fundcomp}(t - t_0) = \quad (15)$$

$$\left(-\frac{1}{G1}\right) K_m \sin(\omega_0 t + \theta - P1)$$

where $t_0 = P1/\omega_0$. The correction signal $F_{fundcorr}(t)$ is input directly to the motor drive to generate a new piston drive force $F1_1$ given by $$F1_1 = F1_0 + F_{fundcorr}(t) = A_0 \sin(\omega_0 t) + \left(-\frac{1}{G1}\right) K_m \sin(\omega_0 t + \theta - P1) \quad (16)$$

The new input signal $F1_1$ is sent to the piston B to adjust its force to conform to $F1_1$. The residual force being transferred to the cryocooler mount becomes $\Delta F_1$, which is given as follows:

$$\Delta F_1 = \quad (17)$$

$$G1\left(A_0 \sin(\omega_0 t + P1) + \left(-\frac{1}{G1}\right) K_m \sin(\omega_0 t + \theta - P1 + P1)\right) +$$

$$G2(-A_0 \sin(\omega_0 t + P2)) + harmonics$$

The above equation can be simplified as $$\Delta F_1 = G1(A_0 \sin(\omega_0 t + P1)) - K_m \sin(\omega_0 t + \theta) + G2(-A_0 \sin(\omega_0 t + P2)) + harmonics \quad (18)$$

Since we know that the fundamental frequency component of the initial residual force $\Delta F_0$ is $$G1(A_0 \sin(\omega_0 + P1)) + G2(-A_0 \sin(\omega_0 + P2)) = K_m \sin(\omega_0 + \theta) \quad (19)$$

$\Delta F1$ becomes $$\Delta F_1 = K_m \sin(\omega_0 t + \theta) - K_m \sin(\omega_0 t + \theta) + harmonics = 0 + harmonics \quad (20)$$

After the correction signal $\Delta F_{fundcorr}(t)$ modifies the force F1 applied to the cryocooler by the piston B, the fundamental frequency component of the residual vibrational force is theoretically reduced to zero. The measurements and the computations described above are an essential building block for a practical vibration reduction system. In reality, these measurements and computations should iterate indefinitely because the forces are not exactly known and are subject to change over time. For example, parameters that can change over time include the system gain and phase, which are not exactly known. Residual forces can change with a change in the operating point, such as stroke amplitude and thermodynamic phase. In an algorithm using an iterative loop, the correction signal $F_{fundcorr}(t)$ computed for each iteration is added to the previous $F_{fundcorr}(t)$ in order for the actual $\Delta F_1$ to converge to zero.

Although the mechanical characteristics of individual cryocoolers will vary slightly in a production run, as will the electrical characteristics of the drive electronics and vibrational force sensors, the system gain $G_B$ and phase $P_B$ for the correction input need not be measured for calibrating each system in order for the algorithm to work. Due to the iterative nature of the algorithm and the wide tolerance for error in the system gain and phase values, the algorithm is inherently robust, and will still converge to an optimum solution. The system phase at a given harmonic can vary by as much as ±45°, and the system gain can vary as long as the gain error remains less than 1, although the number of iterations required for an optimum solution increases as the error increases.

The system's ability to provide accurate correction signals is affected by imperfect sensors which provide uncertain knowledge of the vibrational characteristics. Since P1 and G1 usually are not known precisely, the correction signal $F_{fundcorr}(t)$ does not completely cancel the fundamental frequency component of the residual vibration in the first iteration. $F_{fundcorr}(t)$ has an error due to the uncertainties of G1 and P1, and can be de-fined as:

$$F_{fundcorr}(t) = \left(-\frac{1}{G1}\right) K_m \sin(\omega_0 t + \theta - P1) + e \quad (21)$$

where the error term e is $$e = K_{mi} \sin(\omega_0 t + \Delta P1_i + \theta) \quad (22)$$

where $K_{mi} = (\Delta G1_i) K_{m(i-1)}$, and $\Delta G1_i$ and $\Delta P1_i$ are errors in G1 and P1 in the $i^{th}$ iteration, respectively.

In most practical applications, P1 and G1 can be determined with reasonably good accuracy from measurements, and therefore the errors $\Delta G1_i$ and $\Delta P1_i$ are usually much less than 1° and 90°, respectively. When $\Delta G1_i < 1$ and $-90° < \Delta P1_i < 90°$, e converges to zero as the algorithm iterates, because as the number of iterations approach infinity, $$e = K_{m\infty} \sin(\omega_0 t + \Delta P1_\infty + \theta) \to 0 \quad (23)$$

where $$K_{m\infty} = \left( \prod_{j=0}^{\infty} (\Delta G1_j) \right) K_{m0} \to 0 \quad (24)$$

Therefore, even if the compressor's vibrational characteristics are not known precisely, the residual vibrational force can be still driven to approach zero as the algorithm iterates.

The iterative process for generating correction signals at the fundamental frequency is also applicable to harmonics, with an angular frequency $k\omega_0$ instead of $\omega_0$ for the $k^{th}$ harmonic. The harmonic correction signals, which are computed by the processor for a finite number of harmonic frequencies, are injected into the piston motor drive for one of the pistons. For the harmonics, there are no initial piston drive commands F1 and F2, but the correction signal $F_{harmcorr}$ (t) in each iteration is added to the previous $F_{harmcorr}$ (t) in order for the algorithm to converge.

Figure 2:
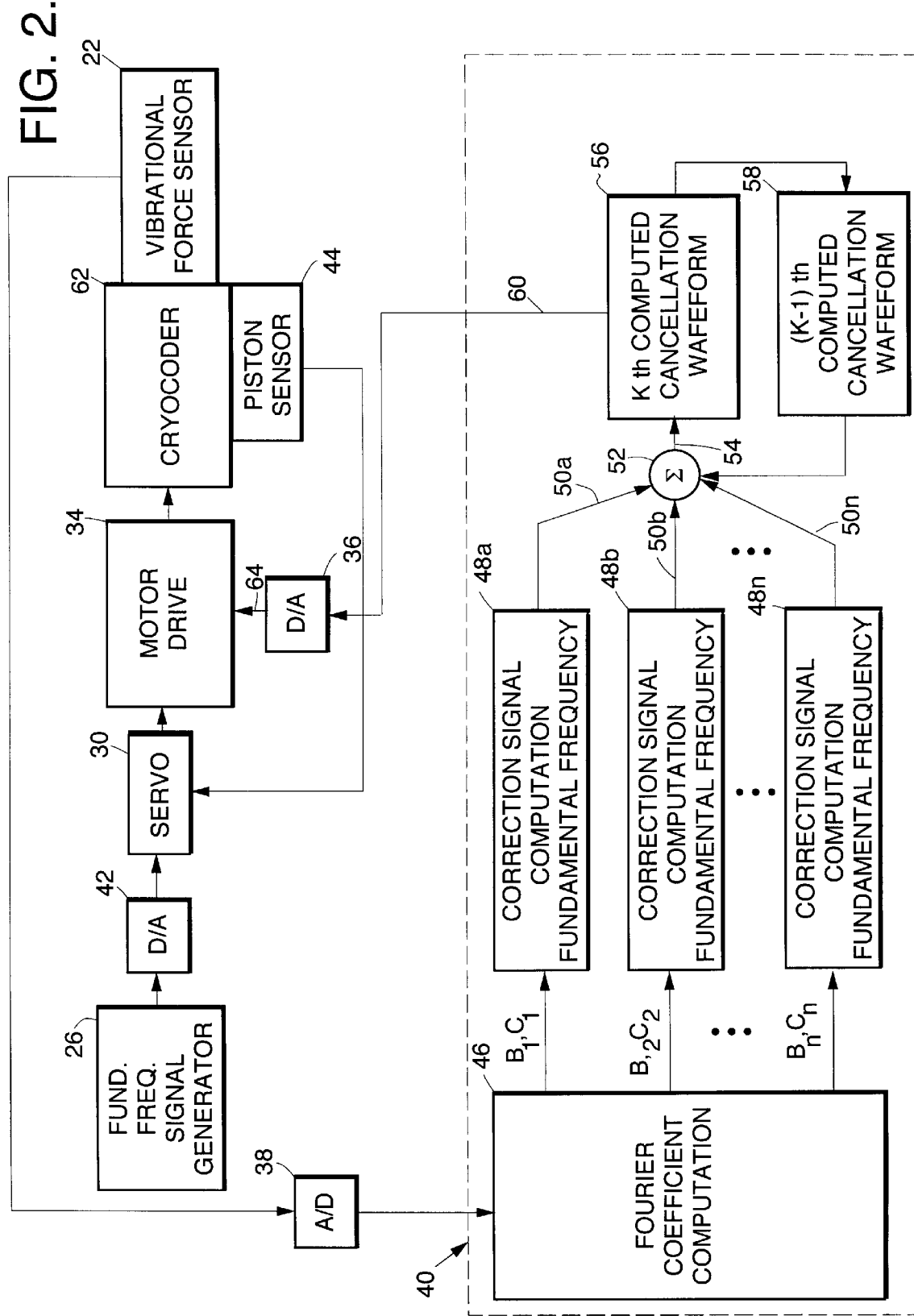
FIG. 2 is a block diagram of an embodiment of the adaptive feedforward vibration control system.

An embodiment of the present invention with an Analog Devices® ADSP-2100 digital signal processor and a Motorola® 68000 microprocessor 40 is illustrated in FIG. 2, which shows the control system for one of the compressor pistons, i.e., piston B; this embodiment is also applicable to the control of the balancer piston in the expander module. Control of all four pistons can be achieved by a single ADSP-2100 digital signal processor and a single Motorola® 68000 microprocessor. The fundamental frequency drive signal generator 26 is embedded in the ADSP-2100 device. The Motorola® 68000 microprocessor performs the computations using an adaptive feedforward algorithm to generate correction signals for the fundamental and harmonic frequencies of interest.

The fundamental frequency signal generator 26 generates a digital drive signal F2, which is converted to an analog sinusoidal command signal by a D/A converter 42. The analog servo 30 drives the piston motor drive 34 for the compressor piston B in the cryocooler 62 so as to produce a piston motion that follows the sinusoidal command signal accurately. A piston position sensor 44 is preferably mounted to the piston to sense its position in real time and feed the position data to the servo 30 to control the piston's motion. A vibrational force sensor 22 is preferably attached to a cryocooler support mounting ring, which provides a force measurement point for measuring the residual vibrations in real time. The force sensor 22 provides an analog signal to represent the sensed vibrational forces, and the analog signal is digitally sampled and quantized by an A/D converter 38 to produce digitized measured force $\Delta F_m$ for the microprocessor 40.

The sampling rate of the A/D converter 38 must be greater than twice the highest harmonic to be analyzed and cancelled according to the Nyquist sampling theorem. It is preferred in practice that the sampling rate be much greater than twice the highest harmonic frequency of interest to provide accurate samples of the analog signal. For example, if the fundamental frequency of the drive piston is 46 Hz, the highest harmonic of interest is six times the fundamental frequency, and the desired sampling rate is 30 samples/cycle, the sampling rate is 46 Hz×6×30 samples/cycle=8.28 kHz. Sampling of one complete cycle of the fundamental frequency is sufficient to provide a "data snapshot" of the sensed analog signal waveform. However, it is preferred that two complete periods of the fundamental frequency be sampled and correlated with each other to reduce the effect of noise. More fundamental frequency periods may be sampled to further improve the accuracy, but the microprocessor would be burdened with more computations, with little added benefit beyond two periods.

The Motorola® 68000 microprocessor performs Fourier coefficient computations 46 for the sine components $B_1$, $B_2$, ... $B_n$ and the cosine components $C_1$, $C_2$, ... $C_n$ of the digitized measured force $\Delta F_m$ according to the integral equations (9) and (10) described above. $B_1$ and $C_1$ are the Fourier coefficients for the fundamental frequency while $B_n$ and $C_n$ are the coefficients for the highest harmonic of interest. In the microprocessor, the Fourier coefficient computations are performed by an algorithm such as a discrete Fourier transform or a fast Fourier transform. To reduce computational complexity and processing time, it is preferred that the Fourier coefficients $B_k$ and $C_k$ be computed by referring to sine/cosine lookup tables with prestored fundamental frequency components and harmonic components of interest. The phase adjustments for the fundamental frequency and harmonic components are computed from the stored P1, P2, ... Pn only once, and need not be recomputed in each iteration. The computed Fourier coefficients are used in correction signal computations 48a, 48b, ... 48n in the time domain, with a separate computation for each of the fundamental and harmonic frequency components. The residual force $\Delta F_{fundcomp}$ at the fundamental frequency is computed according to equation (11) with k=1, and the harmonic residual forces $\Delta F_{2ndcomp}$ ... $\Delta F_{nthcomp}$ are computed according to the same equation but with k=2 ... n, respectively. The amplitude of the fundamental frequency residual force is multiplied by $-1/G1$ in the block 48a according to equation (15) in each iteration. For harmonic residual forces, the gain adjustments are performed in the blocks 48b, ... 48n with equations similar to equation (17), but with P1, G1 and $\omega_0$ replaced by Pk, Gk and $k\omega_0$, respectively, for the $k^{th}$ harmonic.

In the present invention, the values of gain and phase for each frequency component are determined by measurements made before the iterative correction process begins, and are stored in the computer memory. These values can be measured with a sufficiently high degree of accuracy; their precise magnitudes are not required. Although the inaccuracy will produce an error term as defined in equation (22), it converges to zero if the gain error $\Delta G1$ and the phase error $\Delta P1$ are less than 1° and ±90°, respectively. It is preferred that the phase error be less than ±45° for relatively fast convergence. The convergence of the error term is proved in equations (23) and (24).

The correction signals 50a, 50b, ... 50n for the fundamental and harmonic frequency components in the $k^{th}$ iteration are summed together in an adder 52 to produce a combined correction signal 54 that is sent to a correction table for the $k^{th}$ computed cancellation waveform 56. The correction table has a memory that is initially cleared before the first iteration begins. The combined correction signal in each iteration is added in the adder 52 to the signal in the previous $(k-1)^{th}$ iteration, which is stored in a memory for the $(k-1)^{th}$ computed cancellation waveform 58, to produce a new combined correction signal. The memory which stores the combined correction signal in the correction table is updated with each iteration, and it contains the most recently updated combined correction signal. The memory 56 outputs an updated correction signal 60 to the D/A converter 36, which converts the digital signal 60 to an analog correction signal 64. This signal is sent to the piston motor drive 34, which adjusts the piston's drive forces according to the correction signal.

Because the error in the correction signal converges to zero as the algorithm iterates, more iterations produce a more accurate correction signal. The correction signal continues to be output to the piston motor drive to cancel vibrations while the algorithm iterates. A low-cost microprocessor with a relatively low throughput can be used for the computations of the correction signals; however, a fast microprocessor is preferably used if the cost is not a limiting factor.

Another advantage of the invention is that the algorithm corrects imbalances at the fundamental frequency, where previous vibration control systems relied upon manual balancing of the fundamental drive signals. In an experiment with a cryocooler operating at 35 K with a 513 mW load, the compressor's vibrational force at a fundamental frequency of 46 Hz without the adaptive feedforward controlled force cancellation was 439 millinewtons (mN). After one iteration of correction signal computation, the fundamental frequency vibrational force was reduced to 176.5 mN. After 11 iterations, the force was reduced to only 2.71 mN. For the fifth harmonic at 230 Hz, the initial vibrational force was 164 mN, which was reduced to 127.5 mN after 1 iteration and further reduced to 2.4 mN after 11 iterations. Therefore, the invention is effective in actively reducing vibrations at both fundamental and harmonic frequencies.

The correction signal computations require only a small amount of memory. In one implementation with an algorithm written in C for computing correction signals from the fundamental frequency to the fifth harmonic, the required random access memory (RAM) and the electronically erasable programmable read only memory (EEPROM) are less than 32 K words and 27.5 K words, respectively, excluding standard C libraries that define commonly used functions.

While illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An adaptive feedforward control system for reducing vibrations generated by opposite reciprocating pistons, said control system comprising:

a plurality of signal generators connected to generate piston drive signals;

a plurality of servos connected to control piston motor drives in response to the respective drive signals;

a vibration sensor connected to sense vibrations caused by said pistons at a location spaced from said pistons; and a processor connected to provide fundamental frequency correction signals to adjust said piston motor drives in response to the fundamental frequency component of said sensed vibrations so as to reduce said vibrations.

2. The system of claim 1, further comprising an analog-to-digital (A/D) converter that is connected to convert said sensed vibrations to digital vibration signals and to provide said digital signals as an input to said processor.

3. The system of claim 2, wherein said processor is connected to convert said digital vibration signals from the time domain to the frequency domain.

4. The system of claim 3, wherein said digital vibration signals are converted to the frequency domain by a Fourier transform that generates sine-component and cosine-component Fourier coefficients.

5. The system of claim 2, wherein said processor is connected to compute desired gain and phase adjustments to said digital sensed force signals to generate said correction signals.

6. The system of claim 5, wherein said processor is connected to compute a plurality of said correction signals iteratively, and said correction signals are iteratively added to generate an updated correction signal.

7. The system of claim 6, wherein said processor is connected to transmit said updated correction signal to control at least one of said piston motor drives.

8. The system of claim 7, wherein said servo includes analog electronics, further comprising a digital-to-analog (D/A) converter that is connected to convert said updated correction signal to an analog correction signal for controlling said piston motor drive.

9. The system of claim 1, wherein said processor is connected to further provide correction signals at at least some harmonic frequencies for said servos in response to harmonic frequency components of said sensed vibrations.

10. The system of claim 9, further comprising an analog-to-digital (A/D) converter that is connected to convert said sensed vibrations to digital vibration signals at said fundamental and harmonic frequencies.

11. The system of claim 10, wherein said A/D converter is connected to sample said sensed vibrations at a sampling frequency that is sufficient to sample the highest frequency of harmonic vibration to be suppressed, and quantizes said samples to generate said digital vibration signals.

12. The system of claim 11, wherein said processor is connected to convert said digital vibration signals from the time domain to the frequency domain.

13. The system of claim 12, wherein said digital vibration signals are converted to the frequency domain by a Fourier transform that generates sine-component and cosine-component Fourier coefficients for said fundamental and harmonic frequencies.

14. The system of claim 10, wherein said processor is connected to compute a plurality of desired gain and phase adjustments for separate fundamental and harmonic frequencies, and to apply said gain and phase adjustments to generate a plurality of frequency-separated correction signals.

15. The system of claim 14, wherein said processor sums said frequency-separated correction signals to form a combined correction signal that reduces vibrations at said fundamental and harmonic frequencies.

16. The system of claim 15, wherein said processor is connected to compute a plurality of said combined correction signals iteratively, and said combined correction signals are iteratively added to generate an updated combined correction signal.

17. The system of claim 16, wherein said processor includes a correction table and a memory delay that are connected to computed said updated combined correction signal iteratively.

18. The system of claim 17, wherein said processor is connected to transmit said updated combined correction signal after at least some iterations to control at least one of said servos.

19. The system of claim 18, wherein said servo includes analog electronics, further comprising a digital-to-analog (D/A) converter that is connected to convert said updated combined correction signal to an analog correction signal for controlling said servo.

20. The system of claim 19, further comprising an additional D/A converter connected to convert said drive signal to an analog drive signal to control said servo.

21. A method of reducing vibrations generated by a cryocooler that comprises a compressor module with two opposite compressor pistons, and/or an expander module with an expander piston and a balancer piston, said method comprising:

sensing vibrations at a location other than one of the pistons to generate a sensor signal;

converting said sensor signal from the time domain to the frequency domain;

computing the fundamental frequency component of said sensor signal;

computing phase and gain adjustments for said fundamental frequency component;

applying said phase and gain adjustments to said sensor signal to generate a correction signal; and adjusting forces to at least one of the pistons according to said correction signal.

22. The method of claim 21, wherein said sensor signal is converted to a digitized sensor signal by:

sampling said sensed vibrations at a sampling frequency that is sufficient to sample the highest frequency of vibration to be suppressed; and quantizing the samples to generate a digitized sensor signal in the time domain.

23. The method of claim 22, further comprising:

computing at least some harmonic frequency components of said sensed vibrations;

computing harmonic phase and gain adjustments for said harmonic frequency components;

applying said harmonic phase and gain adjustments to said sensed vibrations to generate correction signals at said harmonic frequencies; and combining the correction signals at the fundamental and harmonic frequencies to generate a combined correction signal.

24. The method of claim 23, wherein said sensor signal is converted to the frequency domain by a Fourier transform that generates Fourier coefficients for the fundamental and harmonic frequencies.

25. The method of claim 24, wherein the Fourier coefficients for the fundamental and harmonic frequencies include sine-component coefficients and cosine-component coefficients.

26. The method of claim 25, further comprising the step of reconstructing time-domain vibration signals in separate fundamental and harmonic frequency components from said Fourier coefficients.

27. The method of claim 26, wherein the phase and gain adjustments are computed for separate fundamental and harmonic frequencies and are applied to the respective frequency-separated time-domain vibration signals to generate frequency-separated correction signals.

28. The method of claim 27, further comprising summing said frequency-separated correction signals to generate a combined correction signal.

29. The method of claim 28, wherein a plurality of combined correction signals are generated in at least some iterations, and are iteratively added to generate an updated combined correction signal.

30. The method of claim 29, further comprising the step of transmitting said updated combined correction signal to control at least one of the pistons.

31. A cryocooler, comprising:

a compressor module comprising:

two opposite compressor pistons; and two piston drives connected to drive said compressor pistons;

an expander module comprising:

an expander piston;

a balancer piston opposite said expander piston; and two additional piston drives connected to drive said expander and balancer pistons;

a mounting that supports said compressor and expander modules; and an adaptive feedforward control system for reducing vibrations generated by said pistons, said control system comprising:

a signal generator connected to generate a piston drive signal;

a plurality of servos connected to control said piston drives in response to said drive signal;

a vibration sensor connected to said mounting to sense vibrations caused by said pistons; and a processor connected to provide fundamental frequency correction signals for said servos to adjust said piston drives in response to the fundamental frequency component of said sensed vibrations so as to reduce said vibrations.

32. The cryocooler of claim 31, wherein said processor is connected to further provide harmonic frequency correction signals for said servos in response to at least one harmonic frequency component of said sensed vibrations.

33. A spacecraft, comprising:

a spacecraft body;

a cryocooler on said body, said cryocooler comprising:

a compressor module comprising two opposite compressor pistons;

an expander module comprising an expander piston and a balancer piston opposite said expander piston; and a mounting that supports said compressor and expander modules; and an adaptive feedforward control system for reducing vibrations generated by said pistons, said control system comprising:

a signal generator connected to generate a piston drive signal;

a plurality of servos connected to control piston drives in response to said drive signal;

a vibration sensor connected to said mounting to sense vibrations caused by said pistons; and a processor connected to provide fundamental frequency correction signals for said servos to adjust said piston drives in response to the fundamental frequency component of said sensed vibrations so as to reduce said vibrations.

34. The spacecraft of claim 33, wherein said processor is connected to further provide harmonic frequency correction signals for said servos in response to at least one harmonic frequency component of said sensed vibrations.

* * * * *